H. W. HENKE.
SPEED INDICATING INSTRUMENT OR THE LIKE.
APPLICATION FILED JAN. 29, 1920.
1,393,624.
Patented Oct. 11, 1921.
3 SHEETS—SHEET 1.
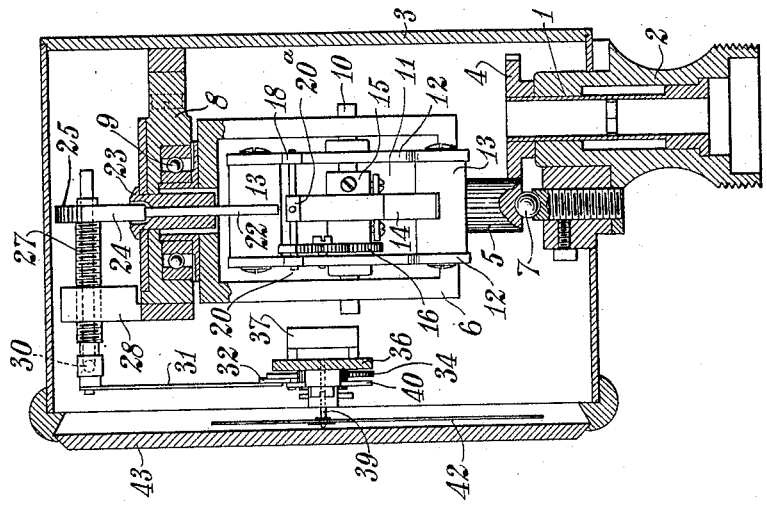
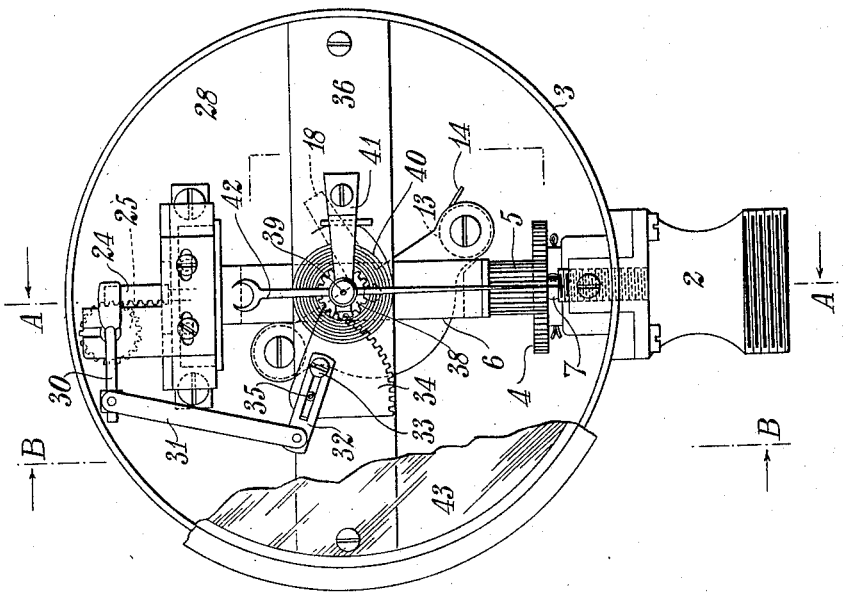
Inventor
H. W. Henke
by Jno. Imrie
Atty.

H. W. HENKE.
SPEED INDICATING INSTRUMENT OR THE LIKE.
APPLICATION FILED JAN. 29, 1920.
1,393,624.
Patented Oct. 11, 1921.
3 SHEETS—SHEET 2.
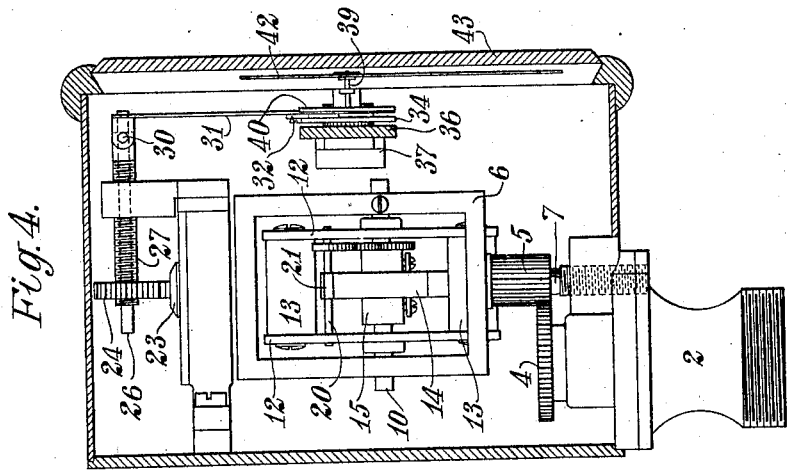
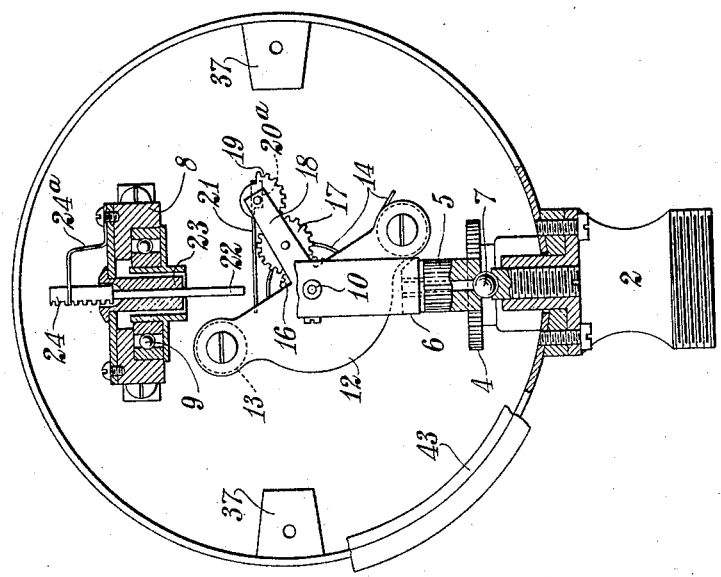
Inventor
H. W. Henke
by Jm. [illegible]
Atty.

H. W. HENKE.
SPEED INDICATING INSTRUMENT OR THE LIKE.
APPLICATION FILED JAN. 29, 1920.

1,393,624.

Patented Oct. 11, 1921.
3 SHEETS—SHEET 3.

Inventor-
H. W. Henke
By Jn. Smuie
Atty.

UNITED STATES PATENT OFFICE.

HAROLD WALTER HENKE, OF LEWISHAM, LONDON, ENGLAND.

SPEED-INDICATING INSTRUMENT OR THE LIKE.

1,393,624. Specification of Letters Patent. Patented Oct. 11, 1921.

Application filed January 29, 1920. Serial No. 354,867.

*To all whom it may concern:*

Be it known that I, HAROLD WALTER HENKE, a subject of His Majesty the King of England, and resident of Lewisham, in the county of London, Kingdom of England, have invented certain new and useful Improvements in or Relating to Speed-Indicating Instruments or the like, of which the following is a specification.

This invention relates to improvements in speed indicating instruments or the like, of the type wherein an indicating needle is actuated about a dial through the medium of a plunger by a centrifugal speed sensitive device or governor, the said device including a frame or member movable about a spindle transverse to the main axis of rotation.

The invention has for its object to provide an efficient speed indicating instrument in which the friction of the moving parts will be reduced to a minimum.

With this and other objects in view the invention consists chiefly in providing on the governor of a speed indicating instrument of the above type, a member which is adapted to directly contact with the plunger connected to the indicating needle, the said member being always at right angles to the plunger and having a motion in its own plane at right angles to the plunger and also a movement toward and from the plunger.

The invention will now be described with reference to the accompanying drawings, in which:

Figure 1 is a front elevation of one form of speed indicating instrument with part of the cover removed;

Fig. 2 is a vertical section taken on the line A—A of Fig. 1;

Fig. 3 is a sectional elevation similar to Fig. 1 with parts removed;

Fig. 4 is a vertical section taken substantially on the line B—B of Fig. 1;

Figure 5:
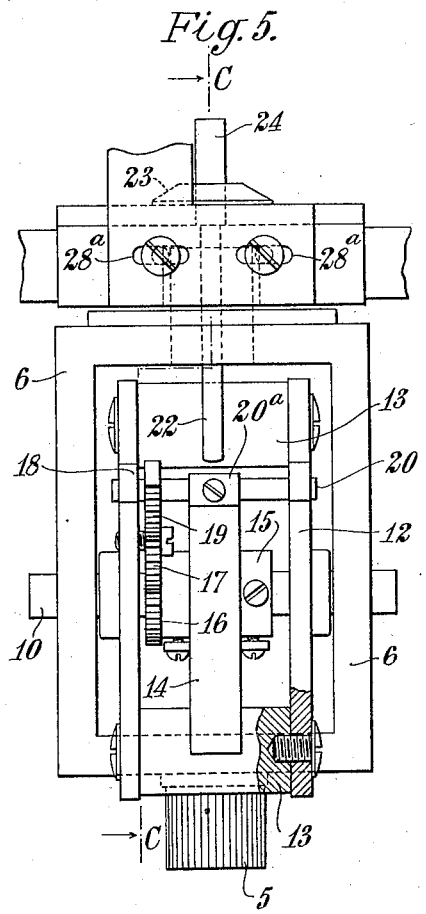
Fig. 5 is a broken elevation showing more particularly the carrier frame and control device mounted therein.
Figure 6:
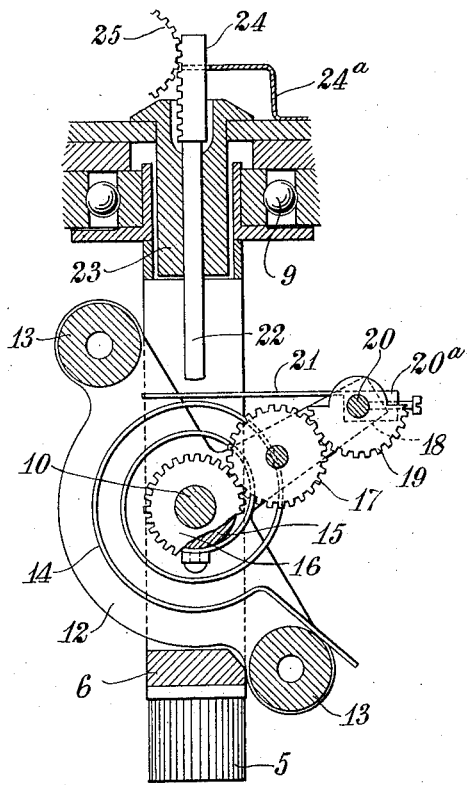
Fig. 6 is a section taken on the line C—C of Fig. 5.

According to one form of this invention as shown in Figs. 1 to 6 the shaft 1, to which is connected the end of a flexible speed transmission shaft in the usual manner, is rotatably mounted in a bearing 2 secured to the casing 3 of the instrument. To the shaft 1 is secured a spur wheel 4 which is adapted to mesh with another spur wheel 5 fitted on the end of a carrier frame 6. This carrier frame is rotatably mounted at one end on an adjustably mounted anti-friction ball 7 and the other end is mounted in a bracket 8 through the medium of an anti-friction bearing 9. A spindle 10 is mounted in the carrier frame 6 and upon this spindle is freely mounted a centrifugal control device 11 comprising a pair of arms 12 which are connected to weighted members 13. The weighted ends 13 of the control device are adapted to move outwardly against the action of a spring 14 when the frame 6 is rotated through the medium of the spur wheels 4 and 5 driven by the transmission shaft. The spring 14 is connected at its inner end to a member 15 secured on the fixed spindle 10 and the outer end thereof is adapted to engage against one of the weighted members 13. Formed or provided on the member 15 is a gear wheel 16 which is adapted to mesh with another gear wheel 17 freely mounted on one of the arms or extensions 18 formed on the arms 12 of the centrifugal control device. This wheel 17 meshes with another gear wheel 19 secured on a spindle 20 which is rotatably mounted in the arms or extensions 18. To the spindle 20 is secured in any suitable manner by solder, or by a set screw, passing through a counterweight $20^a$, a member or table 21 which is adapted to contact with a plunger 22 slidably mounted in a thimble member 23 which is secured to the bracket 8. This plunger 22 which is controlled by a spring, in the manner to be hereinafter described, is formed or provided with a rack 24. This rack 24 is suitably guided in a forked arm $24^a$ secured to the bracket 8 and is adapted to actuate a pinion wheel 25 mounted on a spindle 26. This spindle 26 is a rotatably mounted in a screwed sleeve 27 so that the position of the pinion wheel can be adjusted by turning the sleeve 27 in its carrying bracket 28 which is adjustably secured to the bracket 8 by screws 29 passing through slots $28^a$ in the bracket 28. An arm 30 is formed or provided on the end of the spindle 26 and on this arm 30 is adjustably mounted in any suitable manner one end of a link 31 which is connected at its other end to a slotted member 32. This member 32 is secured by a set screw 33 to a toothed quadrant 34 which is rotatably mounted on a spindle 35 secured to a plate 36. This plate 36 which carries the indicator portion of the instrument is secured to lugs 37 provided on opposite sides of the casing 3. The slotted member 32 can be adjusted by loosening the screw 33 and sliding the said member 32 on the spindle 35 and can be locked in its adjusted position by tightening the screw 33. The toothed quadrant 34 is adapted to mesh with a toothed wheel 38 secured on a spindle 39 which is controlled by a hair spring 40 and mounted in a carrying bracket 41 in the usual manner. To this spindle 39 is fitted an indicator needle 42 which is adapted to move over a suitably calibrated dial, not shown. The case 3 of the instrument is fitted with a suitable glass cover 43.

In operation, the centrifugal control device 11 is rotated by the transmission member through the medium of the gear wheels 4 and 5 and the table 21 will move lengthwise in its own plane and in a plane at right angles to its plane and therefore, in the direction of the plunger 22. Thus the table 21 will engage the end of the plunger rod 22 to move the indicator 42 with the minimum of friction.

It will be seen that the table 21 controls the position of the plunger 22 against the action of the hair spring 40.

Figure 7:
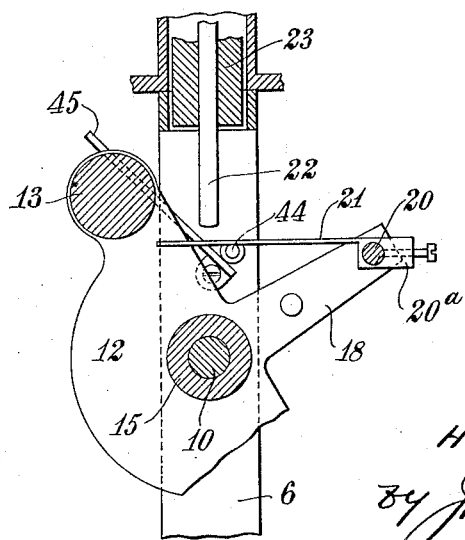
Fig. 7 is a detail of a modification.

In a modified construction, as shown in Fig. 7, the table 21 is mounted on the spindle 20 as previously described but the gear wheels 16, 17 and 19 are omitted. In this instance the table member 21 is provided with a roller or projection 44 at one or both sides which projection or projections 44 are adapted to ride upon a suitable guide arm or frame 45 which may be attached to a fixed part of the carrier frame 6. Thus when the centrifugal control member 11 is rotated, as previously described, the member 21 will rise or fall, according to the speed of rotation.

What I claim is:

1. A speed indicating instrument including an indicator, an element for actuating the indicator, a carrier frame rotatively responsive to speed, a centrifugal control device mounted in said frame, an arm projecting from said control device, a table pivoted on said arm and adapted to actuate said element, and gearing intermediate said table and the carrier frame to move the table on its pivotal mounting to maintain it in a position substantially at right angles to said element in all positions of the control device.

2. A speed indicating instrument including an indicator, a plunger for operating the indicator, a carrier frame rotated on a fixed axis with respect to and in accordance with the speed, a centrifugal control device having its axis mounted in said frame, an arm projecting from and at right angles to the plane of said control device, a strip-like plate pivotally mounted in the free end of said arm, a gear fixed with relation to the frame and concentric with the axis of the control device, and means engaging said gear and operating to turn the plate on its pivot in such correspondence with the movement of the control device as to maintain said plate at right angles to and in operative contact with said plunger.

In testimony whereof I have hereunto signed my name.

HAROLD WALTER HENKE.